(12) United States Patent
Hulme

(10) Patent No.: US 12,179,873 B2
(45) Date of Patent: Dec. 31, 2024

(54) ACCESSORY MOUNTING DEVICE

(71) Applicant: Alexander George Hulme, London (GB)

(72) Inventor: Alexander George Hulme, London (GB)

( * ) Notice: Subject to any disclaimer, the term of this patent is extended or adjusted under 35 U.S.C. 154(b) by 0 days.

(21) Appl. No.: 18/303,812

(22) Filed: Apr. 20, 2023

(65) Prior Publication Data

US 2023/0257050 A1    Aug. 17, 2023

Related U.S. Application Data

(62) Division of application No. 17/233,651, filed on Apr. 19, 2021, now abandoned.

(30) Foreign Application Priority Data

Apr. 17, 2020 (GB) ..................................... 2005639

(51) Int. Cl.
*B62J 11/00* (2020.01)
*H04M 1/04* (2006.01)

(52) U.S. Cl.
CPC .............. *B62J 11/00* (2013.01); *H04M 1/04* (2013.01)

(58) Field of Classification Search
CPC ................................. B62J 11/00; H04M 1/04
USPC ......................................................... 224/420
See application file for complete search history.

(56) References Cited

U.S. PATENT DOCUMENTS

| | | |
|---|---|---|
| D265,816 S | 8/1982 | Matre |
| D318,607 S | 7/1991 | Reid et al. |
| D580,262 S | 11/2008 | Eason et al. |
| 8,727,192 B2 | 5/2014 | Lai |
| 8,857,687 B1 | 10/2014 | An |
| 8,998,048 B1 | 4/2015 | Wu |
| D738,971 S | 9/2015 | Riddiford et al. |
| D775,519 S | 1/2017 | May |
| 9,707,901 B2 | 7/2017 | Lee |
| 10,189,525 B2 * | 1/2019 | Allen .......................... B62J 9/21 |
| D850,899 S | 6/2019 | Gridley |
| 10,330,251 B2 * | 6/2019 | Carnevali ............ F16M 13/022 |
| D852,681 S | 7/2019 | Peters et al. |
| D856,855 S | 8/2019 | Steele |

(Continued)

FOREIGN PATENT DOCUMENTS

| | | |
|---|---|---|
| CN | 110360416 A  * | 10/2019 |
| GB | 6093533 | 6/2020 |
| GB | 2591202 A | 7/2021 |

OTHER PUBLICATIONS

Amazon.com, Arkon RoadVise Motorcycle Phone Mount For iPhone, published Apr. 28, 2015 [retrieved Apr. 27, 2023]. Retrieved from the internet <https://www.amazon.com/RoadVise-Motorcycle-iPhone-Galaxy-Retail/dp/B00X3N4GWE> (Year: 2015).

*Primary Examiner* — Peter N Helvey
(74) *Attorney, Agent, or Firm* — Klintworth & Rozenblat IP LLP

(57) ABSTRACT

An accessory mounting device includes a main body portion configured to connect around a bar or similar in use, and a pair of mounting grips configured to movably connect to the main body from a first position against the body and a second position away from the main body portion, the grips in the second position configured to grip and hold a secondary accessory in position on the mounting device.

20 Claims, 8 Drawing Sheets

(56) References Cited

U.S. PATENT DOCUMENTS

| | | |
|---|---|---|
| D865,881 S | 11/2019 | Muir et al. |
| D895,745 S | 9/2020 | Jones |
| D915,949 S | 4/2021 | Mendez et al. |
| D917,272 S | 4/2021 | Ripert |
| D924,468 S | 7/2021 | Huang |
| D937,137 S | 11/2021 | Keller |
| D937,138 S | 11/2021 | Keller |
| D941,408 S | 1/2022 | Jones |
| D945,897 S | 3/2022 | Brumbach |
| D959,336 S | 8/2022 | Liang |
| D993,836 S * | 8/2023 | Hulme .................. D12/114 |
| 11,760,432 B2 * | 9/2023 | Whitten ................ B62J 11/20 224/420 |
| 2015/0366336 A1 | 12/2015 | Wong |
| 2023/0121029 A1 * | 4/2023 | Hahn .................... B62J 45/00 248/214 |
| 2023/0124001 A1 * | 4/2023 | LeBeau ................. B65D 51/28 224/420 |

* cited by examiner

ACCESSORY MOUNTING DEVICE

CROSS-REFERENCE TO RELATED APPLICATION(S)

This application is a divisional application of U.S. application Ser. No. 17/233,651 filed on Apr. 19, 2021, the contents of which are incorporated herein in its entirety.

FIELD

The present invention relates to an accessory mounting device for a bicycle or similar. More particularly, the present invention relates to an accessory mounting device that connects to a set of handlebars or stem to allow secondary accessories to be mounted on the handlebars or stem via the mounting device.

BACKGROUND

It is common for riders of bicycles, motorcycles and scooters and similar vehicles to own and use a range of secondary items that do not come built into their vehicle. For example, very few makes of bicycle come with built-in lights as standard, and a rider will normally buy a set from a third-party supplier and detachably mount them on the bicycle as required, a normal mounting location for the front light being the bicycle handlebars.

Other items are frequently mounted in the same or a similar manner as required or desired by the user—for example they may mount GPS units, mobile devices such as mobile phones or pads or similar, or similar on the handlebars.

While it is common for items such as bicycle lights to contain their own mounting mechanisms such as integral straps or similar, other items such as GPS units, cameras or mobile devices usually require a separate mounting device. This separate mounting device attaches to the handlebars, with the mobile device, GPS or other accessory then being connected to the mounting device.

Examples of known types of handlebar mounting devices are shown in FIGS. 1 and 2.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY

It is an object of the present invention to provide an accessory mounting device which goes some way to overcoming the abovementioned disadvantages or which at least provides the public or industry with a useful choice.

The term "comprising" as used in this specification and indicative independent claims means "consisting at least in part of". When interpreting each statement in this specification and indicative independent claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

Accordingly, in a first aspect the present invention may broadly be said to consist in an accessory mounting device, comprising: a main body portion configured to connect around a bar or similar in use; a pair of mounting grips configured to movably connect to the main body portion from a first position substantially against the body, and a second position away from the main body portion, the grips in the second position configured to grip and hold a secondary accessory in position on the handlebar mounting device.

In an embodiment, the main body portion and mounting grips are configured so that in the first position the mounting grips fit snugly against the main body portion.

In an embodiment, the main body portion and mounting grips are configured to fold together to form a compact ring-shaped unit.

In an embodiment, the accessory mounting further comprises a central elastomer/plastic shim, the main body portion locating around the shim in use, the shim comprising at least one rib on the outer surface of the shim, aligned around at least part of the circumference of the shim, the main body portion further having at least one channel on the inner surface corresponding to the at least one rib, the rib locating therein in use.

In an embodiment, the shim and main body portion are configured so that the shim can be removed and replaced.

In an embodiment, the shim has an internal diameter of substantially 22 mm.

In an embodiment, the shim has an internal diameter of substantially 25-26 mm.

In an embodiment, the shim has an internal diameter of substantially 31-32 mm.

In an embodiment, the shim is formed from an elastomer or plastic having a shore hardness of substantially 40.

In an embodiment, the mounting grips further comprise extension sliders configured to slide into and out of the main body portion on opposed sides, the sliders substantially fully retracting inside the body in the first position.

In an embodiment, the accessory mounting device further comprises grip springs configured to bias the mounting grips inwards.

In an embodiment, the extension sliders comprise inwardly extending spines, interlacing within the main body portion in the first position.

In an embodiment, the accessory mounting device further comprises compression springs located within the main body portion and aligned in parallel with the extension sliders, the compression springs configured to inwardly bias the spines towards the first position.

In an embodiment, each of the mounting grips comprises a generally spade-shaped inwardly-curving plate.

In an embodiment, the main body portion comprises a connecting portion and a rotating portion, the mounting grips mounted on the rotating portion, the connecting portion and a rotating portion rotatable relative to one another in a flat plane in parallel with the connection axis of the main body portion.

In an embodiment, the rotating portion and connecting portion are mutually configured so that the rotating portion can be held relative to the connecting portion at a first position where the bodies of the mounting grips are generally aligned in parallel with the connection axis of the main body portion, and a second position where the bodies of the mounting grips are generally aligned perpendicular to the connection axis of the main body portion.

In an embodiment, a plurality of friction protrusions extend from the underside of the rotating potion, and a plurality of complementary friction apertures are formed on the upper side of the connecting portion into which the friction protrusions fit in use, the friction protrusions and apertures located at intervals around the rotating and connecting portions so that the rotating portion can rotate between at least two set positions relative to the connecting portion.

In an embodiment, the friction protrusions and apertures are located at substantially 90-degree intervals around the 360-degrees of a full circle.

In an embodiment, each set of protrusions and apertures is aligned perpendicular to each of the edges of the rectangular underside of the rotating portion and the connecting portion.

In an embodiment, the accessory mounting device further comprises a central pin that connects the rotating potion and the connecting portion and which acts as a central axis of rotation.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

BRIEF DESCRIPTION OF THE FIGURES

Further aspects of the invention will become apparent from the following description which is given by way of example only and with reference to the accompanying drawings which show an embodiment of the device by way of example, and in which:

FIG. 2 shows a known, prior art type of handlebar mounting device known as an X-mount, the 'X' portion of the device adjusting inwards and outwards (the angle between the legs of the 'X' to grip the sides of a mobile device or similar.

DETAILED DESCRIPTION

Embodiments of the invention, and variations thereof, will now be described in detail with reference to the Figures.

First Embodiment

A first embodiment of the accessory mounting device 1 is shown in FIGS. 3 to 8.

Figure 1:
FIG. 1 shows a known, prior art type of handlebar mount, formed as a single rigid unit with a handlebar connector for connecting the mount to a set of handlebars at one end, and a device mount at the other end for connecting an accessory to the mount, an elongate body connecting between the two end parts.
Figure 2:
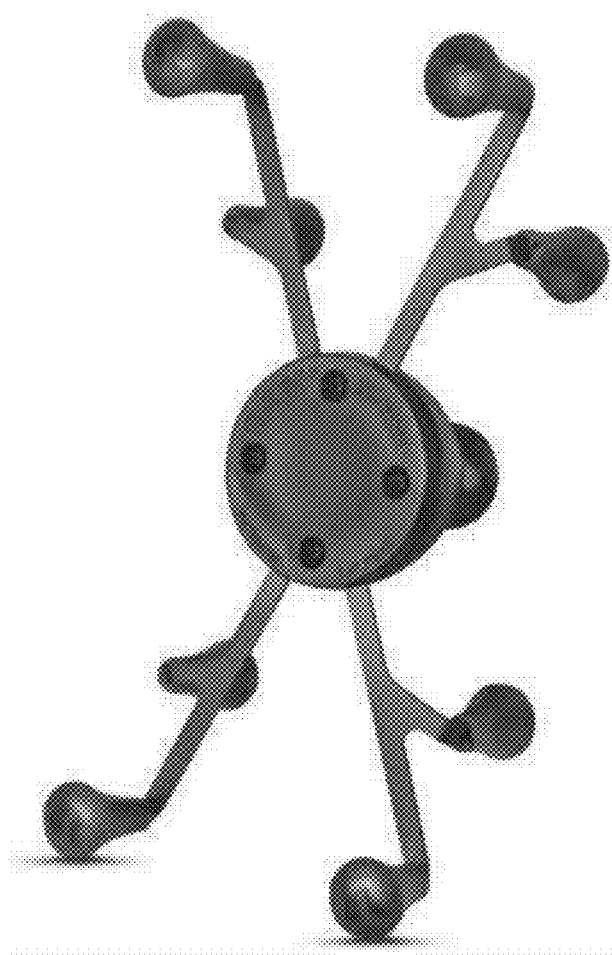
Figure 3:
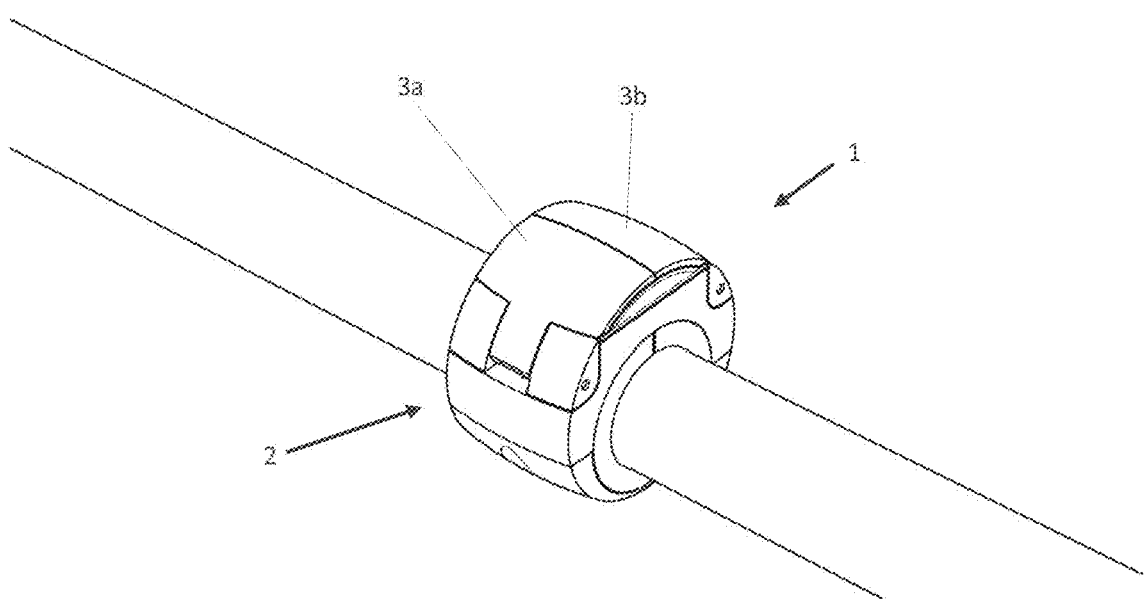
FIG. 3 shows a perspective view of an accessory mounting device according to an embodiment of the invention, comprising a main body portion and a pair of mounting grips, the main body portion connecting around a handlebar or similar to connect the mounting device to a set of bicycle handlebars, motorcycle handlebars, or similar, the main body portion and grips folded together to form a compact ring-shaped unit.

The mounting device 1 comprises a main body portion 2 and a pair of mounting grips 3a, 3b. As shown in FIG. 3, the main body portion 2 connects around a handlebar or similar item such as the bicycle stem to connect the mounting device 1 to a set of bicycle handlebars, motorcycle handlebars, or similar. When not in use holding an accessory (that is, carrying and gripping a secondary item or device such as a mobile phone, camera, or GPS unit), the main body portion 2 and grips 3a, 3b fold together to form a compact ring-shaped unit.

In this embodiment, when compacted, the mounting device 1 is substantially toroidal or ring-shaped with a central aperture 4. The ring-shaped main body portion 2 has flattened planar sides, the plane of the flattened sides perpendicular to the central axis of the handlebar and the central aperture 4.

Figure 4:
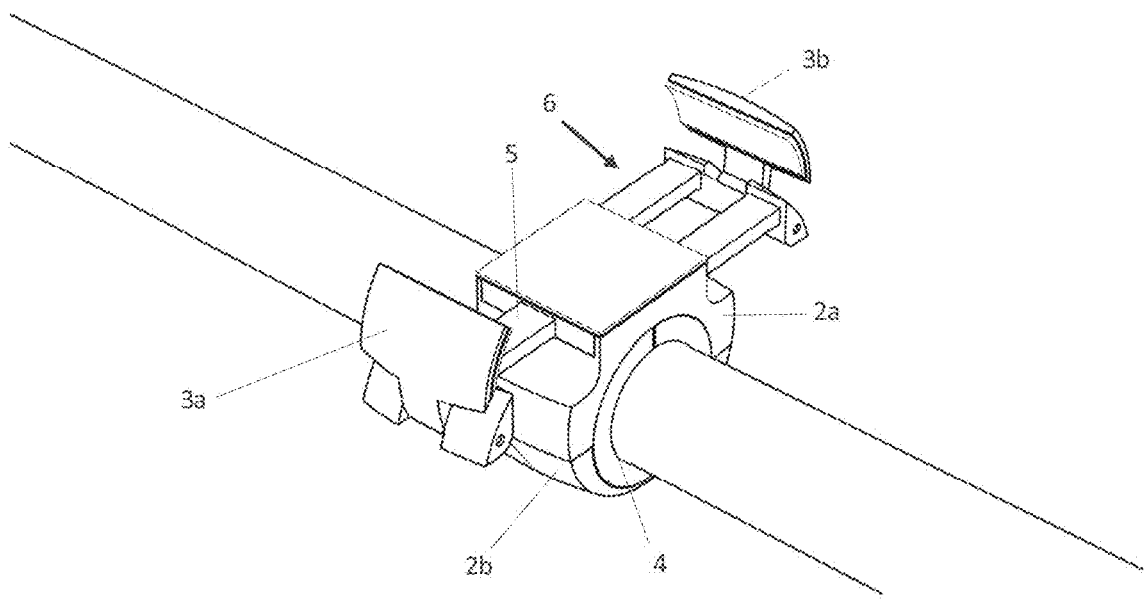
FIG. 4 shows a perspective view from the same angle as FIG. 3 of the embodiment of the accessory mounting device, with the mounting grips unfolded from the main body portion and moved outwards from the main body portion on extension sliders that allow the grips to move inwards and outwards from the main body portion.
Figure 5:
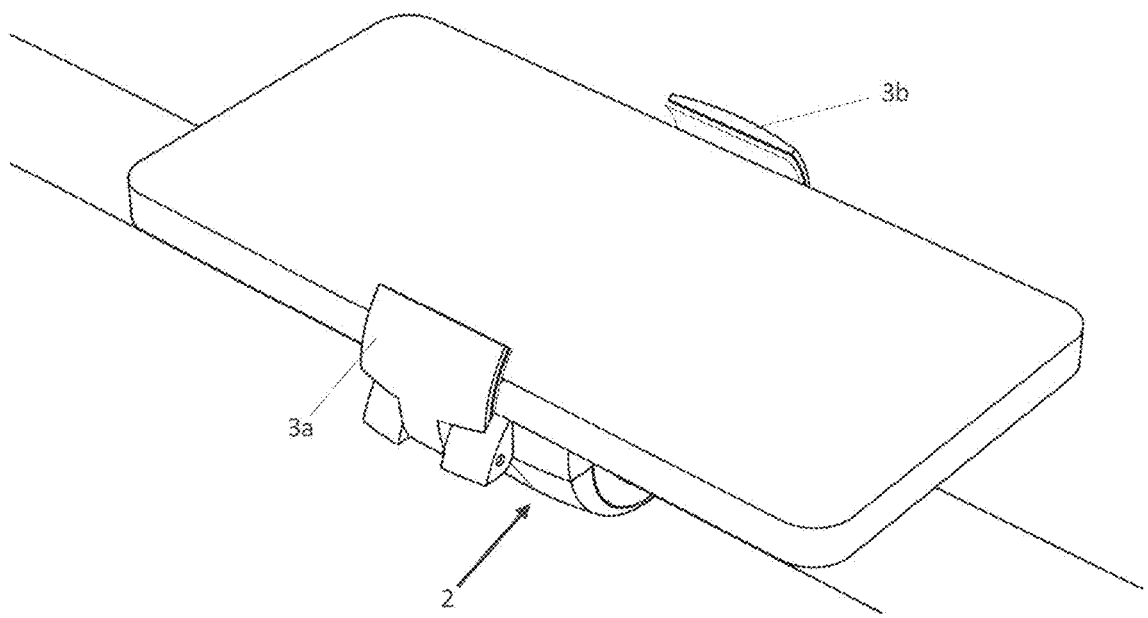
FIG. 5 shows the perspective view of FIG. 3, with a mobile device clamped between the open and extended mounting grips.

As shown in FIG. 4, when in use (gripping and holding a mobile device or similar as shown in FIG. 5), the mounting grips 3a, 3b fold upwards and outwards, and are moved outwards perpendicular to the axis of the central aperture 4 on extension sliders 5, 6. The extension sliders 5, 6 slide inwards and outwards from the main body portion 2, perpendicular to the axis of the central aperture 4. The extension sliders and mounting grips are described in detail below.

The travel distance (the distance that the extension sliders and mounting grips move sliding inwards and outwards) allows the distance between the inner faces of the two mounting grips to be altered, so that these can in use grip the sides of a mobile device or similar as shown in FIG. 5. The distance can be altered, with the mounting grips 3a, 3b remaining in the position to which they are moved, and this allows the handlebar mounting device 1 to be used with accessories/devices of different sizes or widths.

The structure of the device and it's parts will now be described in more detail.

Main Body Portion

The main body portion 2 is generally ring-shaped when viewed from the side, with flat planar sides and an outwardly-rounded or outwardly-curved central portion between the flat sides. The main body portion 2 is formed in two parts, an upper part 2a, and a lower part 2b. The upper and lower parts 2a, 2b are each roughly semi-circular and are connected to form the overall ring shape via apertures on the circumference/perimeter of the ring at each diametrically opposed side. The apertures are located at or towards the free ends of each of the semi-circular halves. The apertures 7 on the lower part 2b correspond with threaded upper apertures (not shown) on the upper part 2a, with screws (not shown) passed into and through the apertures 7 and screwed into the upper apertures to hold the upper and lower parts 2a, 2b together.

A removable elastomer or plastic central shim 8, sized and shaped to fit into the central aperture 4, is in use located into the central aperture 4. The shim 8 has the general overall form of a cylinder, with a smooth inner surface that locates against the surface of the handlebar in use, and an outer surface having two circumferential ribs 9 running around the outer perimeter, the ribs 9 located towards each end of the shim 8. These ribs 9 correspond to and in use locate into two channels 10 that run around the inside of the upper and lower parts 2a, 2b. The shim 8 is formed from rubber/plastic having a shore hardness of substantially 40. The shim 8 is split longitudinally, the split allowing it to be positioned around a handlebar or similar.

In the preferred embodiment, three different sizes of shim are provided for use: a 22 mm internal diameter shim; a 25-26 mm internal diameter shim, and; a 31-32 mm internal diameter shim. Each of these alternative size shims is also formed from elastomer/plastic, and having a shore hardness of substantially 40. The shim can be removed and replaced as necessary, for example to change the size of the internal diameter for different sizes of handlebar, or similar. The three shims are shown as 8a, 8b, 8c on FIG. 6, with ribs 9a, 9b, 9c.

As outlined above, the upper part 2a has grips 3a, 3b mounted on extension sliders 5, 6, that slide into and out of the body of the upper part 2a. When the extension sliders 5, 6 are fully retracted (inside the body 2a), and the grips are folded down/inwards, the grips and sliders follow the outline of, and complete, the outer part of the main body portion 2, so that this appears substantially smoothly contoured, as a semi-toroidal ring (the central part being curved, with cut-off, flat planar sides, as outlined above).

Sliders

The sliders 5, 6 and upper part 2a are formed so that the sliders 5, 6 extend and slide into and out of the upper part 2a on opposed sides.

The sliders are structured as follows:

Slider element 5 has a single central spine 5a, with a pair of mounting knobs 5b extending each side of the central spine 5a at the outer end, so that there is a gap between the mounting knobs 5b.

Slider element 6 comprises a pair of spaced-apart spines 6a, 6b arranged in parallel, with a pair of mounting knobs 6c located at the ends of the spines 6a, 6b.

Figure 6:
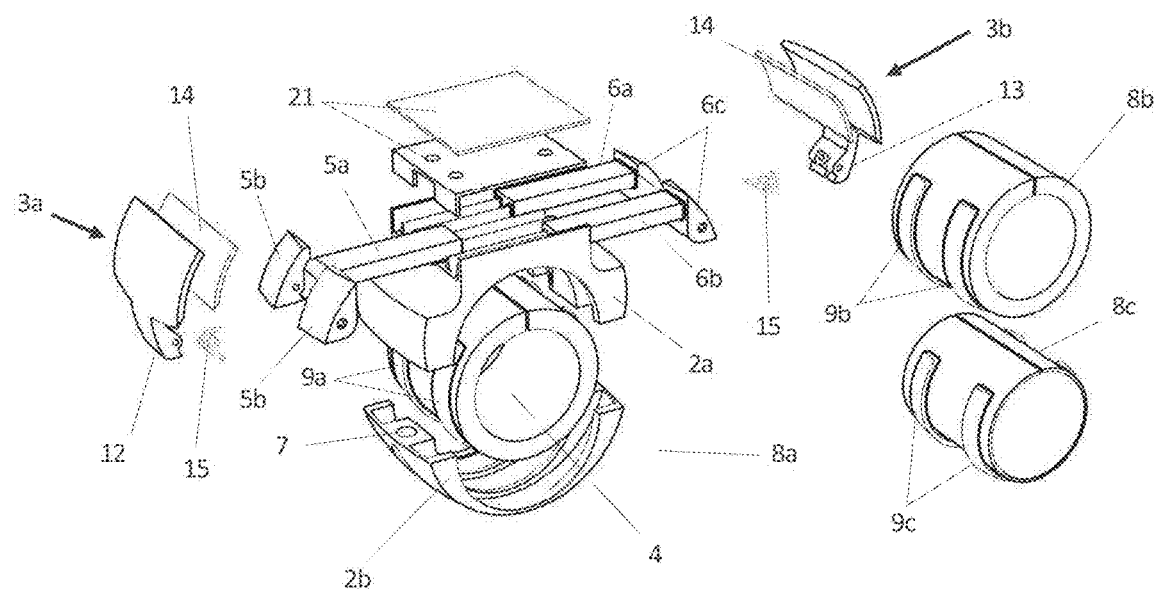
FIG. 6 shows a perspective exploded view of the accessory mounting device from the same angle as FIGS. 3, 4 and 5, showing detail of the main body portion, a shim that locates into the central aperture of the main body portion, and the grips and extension sliders.

The gap between the spines 6a, 6b is sized and shaped so that the single central spine 5a of the slider 5 can fit snugly between the spines 6a, 6b, so that the three slider elements are in parallel and slide past each other into and out of the upper part 2a of the main body portion 2, as shown in FIG. 6.

Each of the spines 5a, 6a, 6b has the form of an inverted channel—an inverted u-channel with squared off sides. The top part of the upper part 2a comprises a flat surface with a number of rails or dividers 20 extending upwards therefrom, with the dividers 20 aligned in parallel with the outer side faces of the main body portion 2, and in parallel with the direction of travel of the slider elements. The channels of the spines, and the extensions, are mutually sized so that the spines fit over and onto the extensions, the extensions acting as guide rails for the spines. The inner or central spine 5a fits snugly between and moves between the outer spines 6a, 6b.

Figure 7:
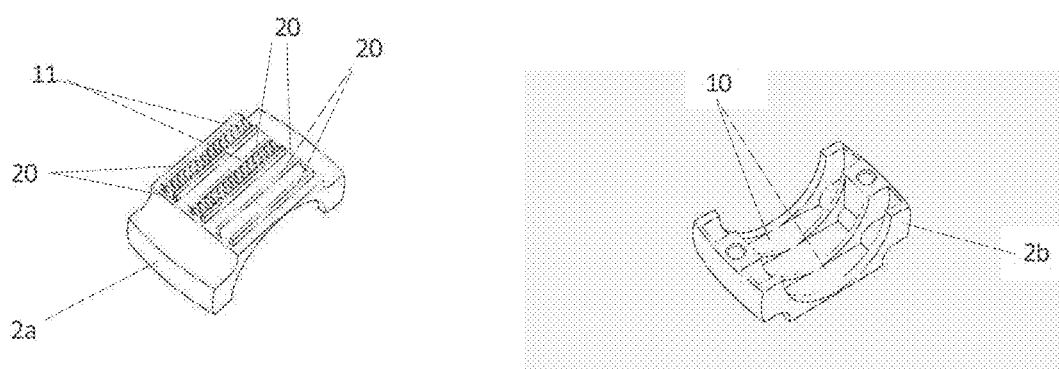
FIG. 7 shows detail of the interior of the upper and lower main body portions.

As can be seen in FIG. 7, the rails or dividers 20 form three corridors across the top of the upper part 2a. Compression springs 11 are located within these channels. The compression springs create grip in the longitudinal plane and automatically close the runners/spines.

The open top of the upper part 2a is closed with a top cover 21.

Mounting Grips

As outlined above, the mounting grips 3a, 3b fold inwards and outwards, the axis around which they rotate to fold inwards and outwards aligned in parallel with the central aperture 4.

Each mounting grip 3a, 3b has the general appearance roughly of a spade or shovel, inverted so that the 'handle' extends downwards and the body upwards, the body shaped to curve inwards.

The mounting grip 3a is rotatably connected between the mounting flanges or knobs 5b via the mounting grip handle 12, so the mounting grip 3a rotates inwards and outward over the top of the spine 5a. The mounting grip 3b is connected to the knob 6c via the mounting grip handle 13, so the mounting grip 3b rotates inwards and outward over the top of the spines 6a, 6b.

Each mounting grip 3a, 3b has a rubber pad 14 or similar connected to its inner face, to provide a cushion when it abuts the edge of a mobile device or any similar accessory with which it is being used.

Figure 8:
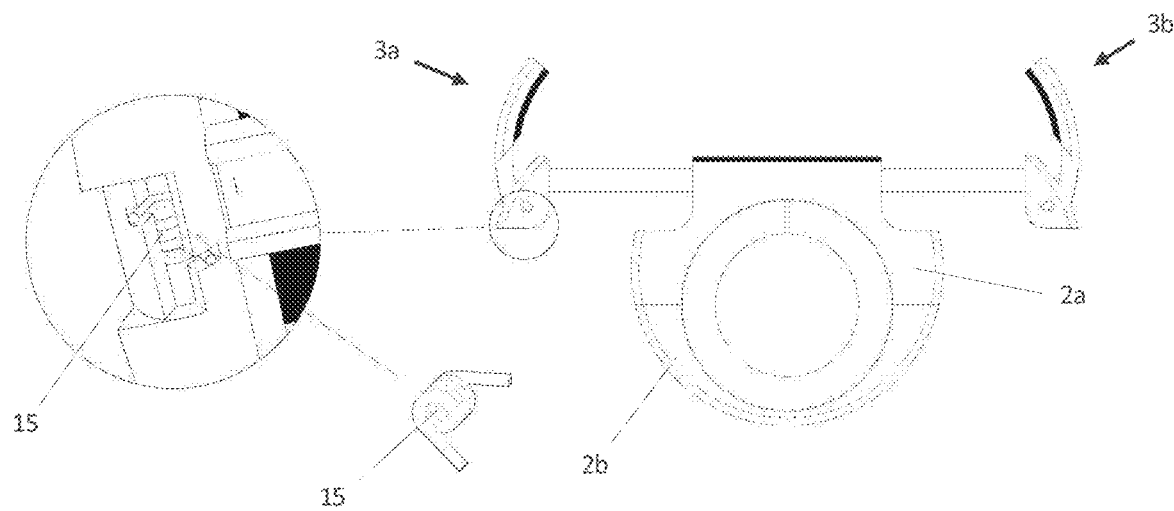
FIG. 8 shows detail of coil/torsion springs located on the accessory mounting device, arranged so that the mounting grips are biased inwards.

As shown in FIG. 8, coil/torsion springs 15 are located connecting between the mounting grip handles and the mounting knobs, arranged so that the mounting grips are biased inwards. This helps to increase the grip on the side of any accessory which is being used with the mounting device.

Use

In use, a user will select a central shim of the correct size, and position this around the handlebar or similar. They will then place the upper and lower parts 2a, 2b in position around this, and screw them together. The mounting grips 3a, 3b can then be folded outwards and moved outwards on the sliders to the correct separation so that a mobile device or similar can be placed between them, the mounting grips moved inward to grip snugly on the edges of the device.

When not in use, with no accessory gripped, the mounting grips 3a, 3b fold inwards and slid fully inwards towards the main body portion 2, so as to minimize the volume, and to remove any elements that are protruding and which might catch on clothing or similar.

Second Embodiment

A second embodiment of the accessory mounting device 100 is shown in FIGS. 9 to 12.

The sliders and mounting grips of this second embodiment are identical to those described above for the first embodiment, and the elements on the Figures are numbered as e.g. sliders 105, 106 or mounting grips 103a, 103b in contrast to the sliders 5, 6 or mounting grips 3a, 3b of the first embodiment.

The main body portion 102 of the second embodiment is very similar to that of the first embodiment. The main body portion 102 is formed in two parts, an upper part 102a, and a lower part 102b. The lower part 102b is identical to that of the first embodiment, and the two parts are connected together in the same manner, via apertures on the circumference/perimeter of the ring at each diametrically opposed side, located at or towards the free ends of each of the semi-circular halves.

A removable elastomer or plastic central shim 108, identical to that/those of the first embodiment, is located into the central aperture 104.

The upper part 102a of the main body portion 102 of the second embodiment has two parts: a connecting portion 120 and a rotating portion 121.

The rotating portion 121 is similar to the upper part 2a of the first embodiment. Mounting grips 103a, 103b are connected in the same manner as for the first embodiment. That is, the grips 103a, 103b are mounted on extension sliders 105, 106, that slide into and out of the rotating portion 121. When the sliders 105, 106 are fully retracted and the grips are folded down/inwards, the grips and sliders follow the outline of, and complete, the outer part of the main body portion 102, so that this appears substantially smoothly contoured, as a semi-toroidal ring (the central part being curved, with cut-off, flat planar sides, as outlined above).

Figures 9A, 9B:
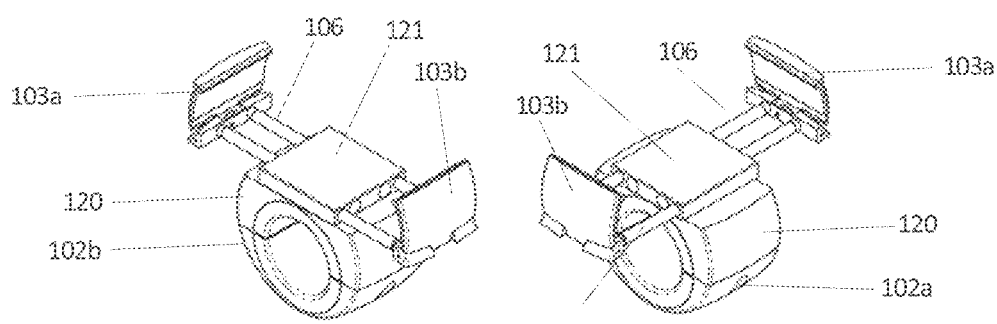
FIGS. 9a and 9b show perspective views from above and to one side of a second embodiment of the accessory mounting device, comprising a main body portion and a pair of mounting grips, the main body portion connecting around a handlebar or similar to connect the mounting device to a set of bicycle handlebars, motorcycle handlebars, or similar, the main body portion and grips folded together to form a compact ring-shaped unit, the main body portion having a connecting portion and a rotating portion to which the mounting grips are connected, and which allows the mounting grips to be rotated around the connecting portion, the rotating portion shown in a first position where the bodies of the mounting grips are generally aligned in parallel with the axis of the handlebars in FIG. 9a, and in a second position where the bodies of the mounting grips are generally aligned perpendicular to the axis of the handlebars in FIG. 9b.
Figure 10:
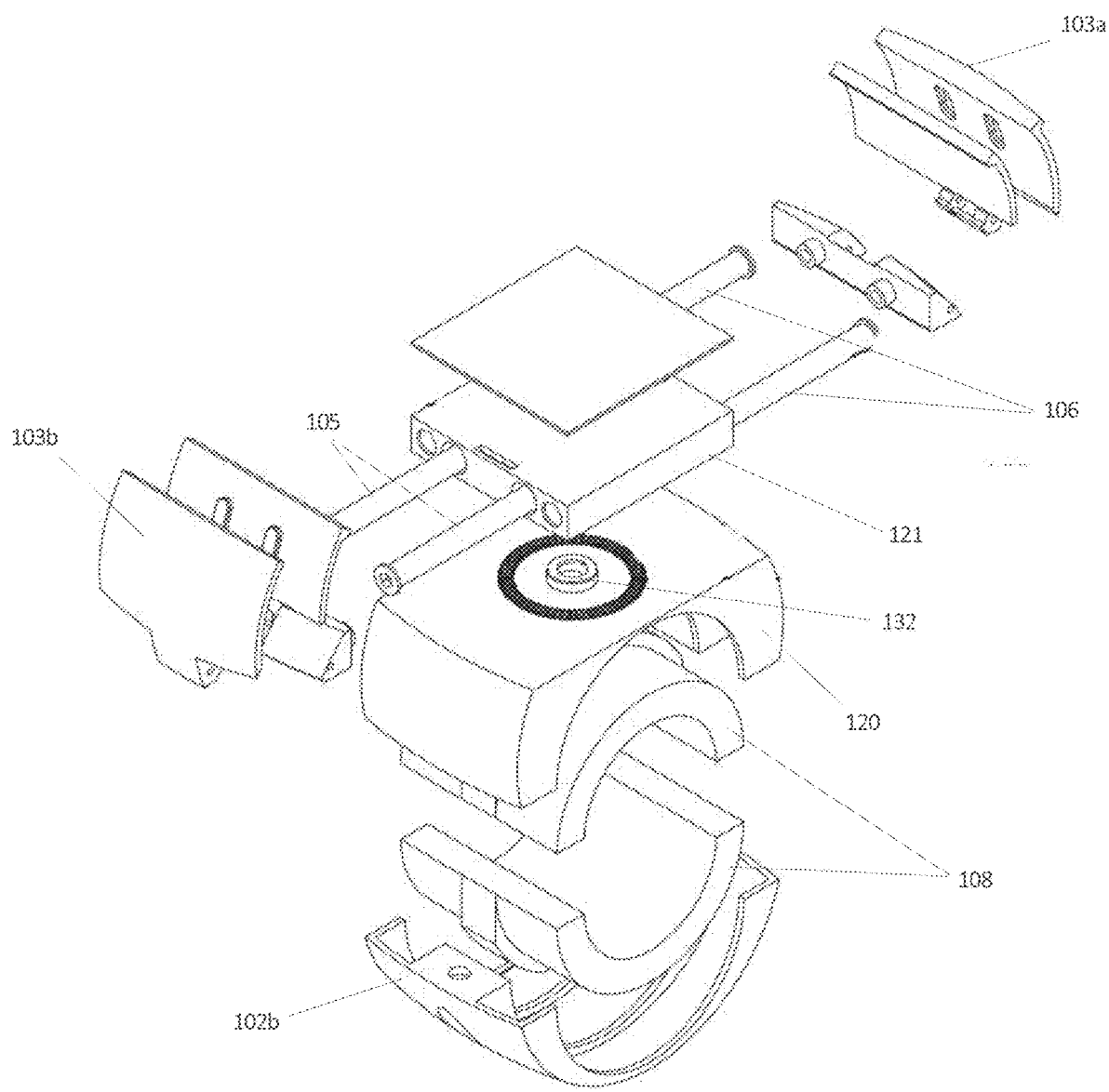
FIG. 10 shows an exploded perspective view from one side and above of the second embodiment of the accessory mounting device, showing detail of a rotation mechanism that allows the rotating portion to rotate between the first and second positions.
Figure 11:
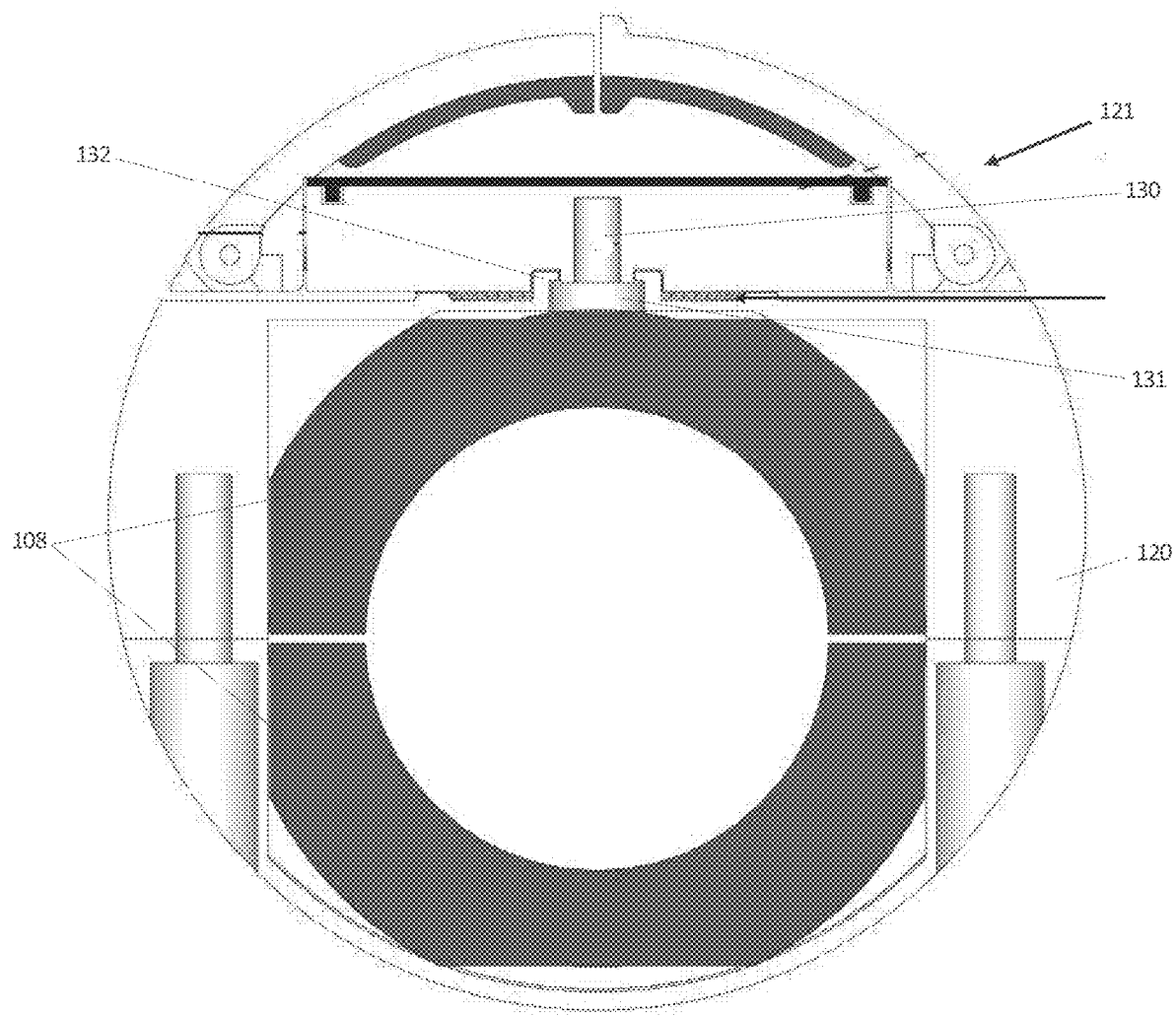
FIG. 11 shows a cutaway side view of the second embodiment of the accessory mounting device
Figure 12:
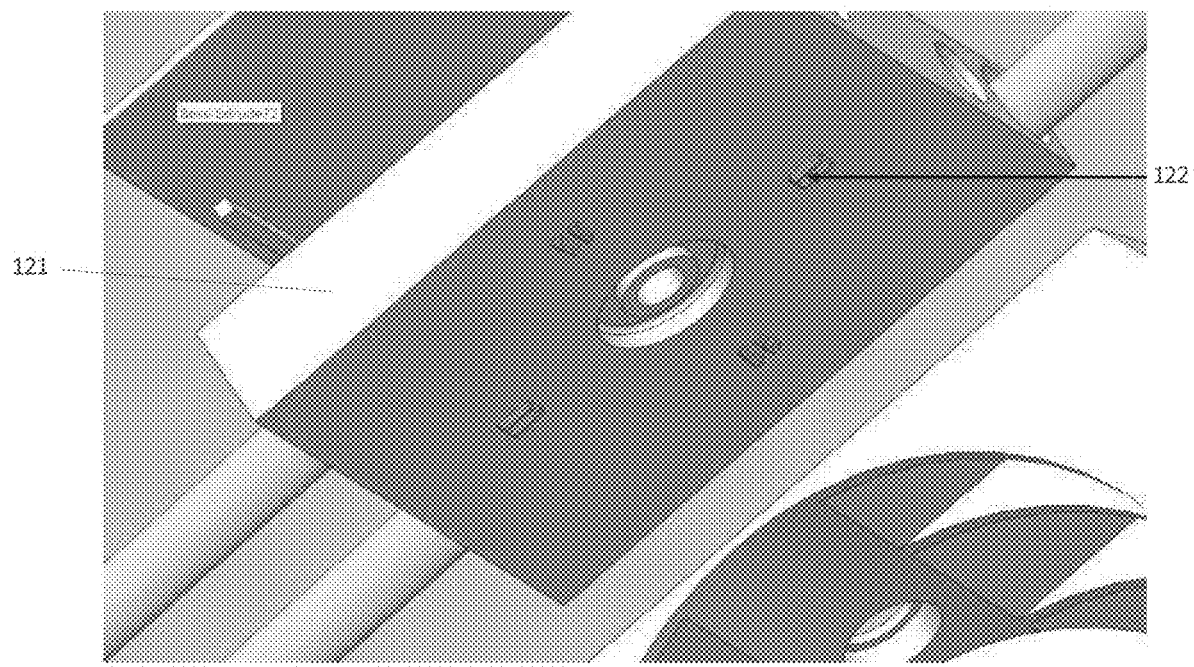
FIG. 12 shows a partial exploded view from underneath and to one side of the second embodiment of the accessory mounting device, showing detail of the underside of the rotating portion, having locators to ensure that the rotating portion will remain in the first or second position until a rotational force is applied to move it.

However, in this embodiment, the rotating portion 121 can rotate relative to the connecting portion 120, in a flat plane in parallel with the axis of the central aperture 104. The rotating potion 121 can rotate fully through a 360-degree circle. However, it is most useful if the rotating portion 121 is held at two positions—a first position where the bodies of the mounting grips are generally aligned in parallel with the axis of the handlebars, as shown in FIG. 9a, and a second position where the bodies of the mounting grips are generally aligned perpendicular to the axis of the handlebars as shown in FIG. 9b.

Connection and rotation of the rotating potion 121 and the connecting portion 120 is achieved via a central pin 130 that has an end flange 131 that locates into a recess 132 in the upper surface of the connecting portion 120, the recess and flange preventing the pin from moving upwards out of the connecting portion 120. The body of the pin 130 extends upwards out of the recess 132 to connect with the rotating portion, e.g. by mutual threading or similar. The pin and recess are located at the center point of the rotating potion 121 and the connecting portion 120.

The holding of the rotating portion 121 in these two positions is achieved by including friction protrusions 122 on the underside of the rotating potion 121, that locate into equivalent friction apertures (not shown) on the upper side of the connecting portion 120. The fit and dimensioning of the protrusions and the apertures is sufficient so that in normal use the connecting portion and rotating portion will be held in position relative to one another. However, if a user grasps the rotating portion and applies a rotational or twisting force (such as one might use to undo a jar lid or similar), then the rotating portion will rotate, and 'click' into the next position.

The friction protrusions and apertures are located at substantially 90-degree intervals around the 360-degrees of a full circle, each set of protrusions and apertures aligned perpendicular to each of the edges of the rectangular underside of the rotating portion and the connecting portion 120. Each set of protrusions comprises a pair of short protrusions next to one another and in parallel with one another and perpendicular to the associated edge. The apertures are complementary to the protrusions.

The accessory mounting device 100 of the second embodiment is used in a similar way to the first, except that a user has the option of rotating the device held in the mounting grips through 90-degrees or more—e.g. to adjust this from a portrait to a landscape orientation as preferred.

The invention claimed is:

1. An accessory mounting device comprising:
   a central elastomer/plastic shim configured to connect around a bar or similar in use, the shim having an outer surface defining a circumference and comprising at least one rib on the outer surface aligned around at least part of the circumference;
   a main body portion locating around the shim in use, the main body portion having at least one channel on an inner surface corresponding to the at least one rib, the at least one rib locating therein in use;
   a pair of mounting grips configured to movably connect to the main body portion from a first position substantially against the main body portion, and a second position away from the main body portion, the mounting grips in the second position configured to grip and hold a secondary accessory in position on the accessory mounting device; and
   the main body portion and the mounting grips being configured to fold together to form a compact ring-shaped unit.

2. The accessory mounting device as claimed in claim 1, wherein the main body portion and mounting grips are configured so that in the first position the mounting grips fit snugly against the main body portion.

3. The accessory mounting device as claimed in claim 1, wherein the shim and the main body portion are configured so that the shim can be removed and replaced.

4. The accessory mounting device as claimed in claim 3, wherein the shim has an internal diameter of substantially 22 mm.

5. The accessory mounting device as claimed in claim 3, wherein the shim has an internal diameter of substantially 25-26 mm.

6. The accessory mounting device as claimed in claim 3, wherein the shim has an internal diameter of substantially 31-32 mm.

7. The accessory mounting device as claimed in claim 1, wherein the shim is formed from an elastomer or plastic having a shore hardness of substantially 40.

8. The accessory mounting device as claimed in claim 1, wherein the mounting grips further comprise extension sliders configured to slide into and out of the main body portion on opposed sides, the extension sliders substantially fully retracting inside the main body portion in the first position.

9. The accessory mounting device as claimed in claim 8, further comprising grip springs configured to bias the mounting grips inwards.

10. The accessory mounting device as claimed in claim 8, wherein the extension sliders comprise inwardly extending spines, interlacing within the main body portion in the first position.

11. The accessory mounting device as claimed in claim 10, further comprising compression springs located within the main body portion and aligned in parallel with the extension sliders, the compression springs configured to inwardly bias the spines towards the first position.

12. The accessory mounting device as claimed in claim 1, wherein each of the mounting grips comprises a generally spade-shaped inwardly-curving plate.

13. The accessory mounting device as claimed in claim 1, wherein the main body portion comprises a connecting portion and a rotating portion, the mounting grips mounted on the rotating portion, the connecting portion the rotating portion rotatable relative to one another in a flat plane in parallel with a connection axis of the main body portion.

14. The accessory mounting device as claimed in claim 13, wherein the rotating portion and connecting portion are mutually configured so that the rotating portion can be held relative to the connecting portion at a first position where the mounting grips are generally aligned in parallel with the connection axis of the main body portion, and a second position where the mounting grips are generally aligned perpendicular to the connection axis of the main body portion.

15. The accessory mounting device as claimed in claim 14, wherein a plurality of friction protrusions extend from an underside of the rotating portion, and a plurality of complementary friction apertures are formed on an upper side of the connecting portion into which the friction protrusions fit in use, the friction protrusions and friction apertures located at intervals around the rotating and connecting portions so that the rotating portion can rotate between at least two set positions relative to the connecting portion.

16. The accessory mounting device as claimed in claim 15, wherein the friction protrusions and friction apertures are located at substantially 90-degree intervals around the 360-degrees of a full circle.

17. The accessory mounting device as claimed in claim 16, wherein the underside of the rotating portion is rectangular and an underside of the connecting portion is rectangular, and wherein each set of friction protrusions and friction apertures is aligned perpendicular to each of edge of the rectangular undersides of the rotating portion and the connecting portion.

18. The accessory mounting device as claimed in claim 13, further comprising a central pin connecting the rotating portion and the connecting portion and which acts as a central axis of rotation.

19. An accessory mounting device comprising:
a main body portion configured to connect around a bar or similar in use;
a pair of mounting grips configured to movably connect to the main body portion from a first position substantially against the main body portion, and a second position away from the main body portion, the mounting grips in the second position configured to grip and hold a secondary accessory in position on the accessory mounting device, the mounting grips further comprising extension sliders configured to slide into and out of the main body portion on opposed sides, the extension sliders substantially fully retracting inside the main body portion in the first position, the extension sliders comprising inwardly extending spines, interlacing within the main body portion in the first position; and
the main body portion and the mounting grips being configured to fold together to form a compact ring-shaped unit.

20. The accessory mounting device as claimed in claim 19, further comprising compression springs located within the main body portion and aligned in parallel with the extension sliders, the compression springs configured to inwardly bias the spines towards the first position.

* * * * *